United States Patent
Hsu et al.

(10) Patent No.: US 7,430,066 B2
(45) Date of Patent: Sep. 30, 2008

(54) METHOD AND USER INTERFACE FOR PERFORMING AN AUTOMATIC SCAN OPERATION FOR A SCANNER COUPLED TO A COMPUTER SYSTEM

(75) Inventors: Chuan-Yu Hsu, Hsinchu (TW); Jay Liu, Hsinchu Hsien (TW); T. J. Hsu, Tainan Hsien (TW)

(73) Assignee: Transpacific IP, Ltd., Taipei (TW)

( * ) Notice: Subject to any disclaimer, the term of this patent is extended or adjusted under 35 U.S.C. 154(b) by 597 days.

(21) Appl. No.: 10/626,200

(22) Filed: Jul. 22, 2003

(65) Prior Publication Data

US 2004/0070787 A1 Apr. 15, 2004

Related U.S. Application Data

(63) Continuation of application No. 09/417,497, filed on Oct. 13, 1999, now Pat. No. 6,650,432.

(51) Int. Cl.
*H04N 1/04* (2006.01)
*G06F 3/12* (2006.01)

(52) U.S. Cl. ............ 358/474; 358/1.1
(58) Field of Classification Search .......... 358/1.15, 358/474, 476, 475; 709/208, 326; 382/167, 382/176

See application file for complete search history.

(56) References Cited

U.S. PATENT DOCUMENTS

| | | | | |
|---|---|---|---|---|
| 5,127,048 A | * | 6/1992 | Press et al. | 379/100.15 |
| 5,140,414 A | * | 8/1992 | Mowry | 348/577 |
| 5,812,125 A | * | 9/1998 | Wilkinson | 715/733 |
| 5,845,076 A | * | 12/1998 | Arakawa | 709/203 |
| 6,137,041 A | * | 10/2000 | Nakano | 84/470 R |
| 6,137,591 A | * | 10/2000 | Kikinis | 358/1.6 |
| 6,256,662 B1 | * | 7/2001 | Lo et al. | 709/203 |
| 6,327,056 B1 | * | 12/2001 | Tsai et al. | 358/474 |
| 6,618,512 B1 | * | 9/2003 | Yamaguchi | 382/319 |
| 6,650,432 B1 | * | 11/2003 | Hsu et al. | 358/1.15 |
| 6,900,911 B1 | * | 5/2005 | Yamazaki | 358/3.26 |
| 7,072,506 B1 | * | 7/2006 | Hirota et al. | 382/162 |

FOREIGN PATENT DOCUMENTS

JP 2001094801 * 4/2001

* cited by examiner

*Primary Examiner*—Jerome Grant, II
(74) *Attorney, Agent, or Firm*—Stolowitz Ford Cowger LLP

(57) ABSTRACT

A method and user interface is provided for use on a computer system coupled with a scanner for performing an automatic scan operation on an original document, with the computer system running a scanner driver and an application program. By the method and user interface, the scanner is first activated to perform a primitive scan operation on the original document based on the default image processing settings to thereby obtain a primitive scanned image. Next, the scanner driver is activated to perform a set of image processing routines on the primitive scanned image to thereby obtain the image qualities of the original document; and based on the image qualities of the original document, a set of suited image processing settings are specified for optimal scan of the original document. The suited image processing settings are then used to replace the default image processing settings, and the scanner is again activated to perform a final scan operation on the original document based on the suited image processing settings to thereby obtain a final scanned image which is transferred to the application program for use by the application program.

18 Claims, 2 Drawing Sheets

METHOD AND USER INTERFACE FOR PERFORMING AN AUTOMATIC SCAN OPERATION FOR A SCANNER COUPLED TO A COMPUTER SYSTEM

CROSS-REFERENCE TO RELATED APPLICATION

This application is a continuation application of, and claims the priority benefit of, U.S. application Ser. No. 09/417,497 filed on Oct. 13, 1999 now U.S Pat. No. 6,650,432.

BACKGROUND OF THE INVENTION

1. Field of the Invention

This invention relates to scanner technology, and more particularly, to a method and user interface for performing an automatic scan operation for a scanner coupled to a computer system, which allows the user to acquire scanned images in a more user-friendly manner.

2. Description of Related Art

A scanner allows a user to convert the printed matter on a document into a digital image for further processing by a computer. In the use of a scanner, however, it requires highly-experienced users to do the image processing tasks properly. For inexperienced users, it usually requires a long period to learn, typically in a trial-and-error manner, which would make the training quite cost-ineffective since additional electricity and paper cost may be required.

The U.S. Pat. No. 4,837,635 discloses a method that allows the user to first obtain a primitive scanned image from the scanner, and then specify suited image processing settings such as size and scan area for the scanner to perform a second scan operation on the original document to thereby obtain a final scanned image. By this method, the final scanned image is close in image qualities to the original document. One drawback to this patent, however, is that it is quite laborious to use due to the reason that it requires the user to specify the settings. Moreover, it is still insufficient in functionality to meet user demands in high-end image processing.

In the use of many conventional image scan programs, it requires the user to specify various image processing settings to the scan operation. To specify these settings properly, however, the user is required to have learned knowledge background in the science of image processing. Therefore, for unlearned and inexperienced users, it would be highly difficult for them to specify these settings properly, which would make the use of the scanner very user-unfriendly.

In summary, conventional user interfaces for scanner operation have the following drawbacks.

First, they require the user to have learned knowledge background in the science of image processing in order to properly specify the image processing settings, which makes the use of the scanner quite difficult and user-unfriendly.

Second. if a user has no such knowledge background, the user needs to spend much time to learn the image scan operation, typically in a trial-and-error manner, which would make the use of the scanner quite cost-ineffective.

Third, the U.S. Pat. No. 4,837,635 provides only limited functionality to the image processing, which would not meet user demands in high-end image processing.

SUMMARY OF THE INVENTION

It is therefore an objective of this invention to provide a method and user interface for use on a computer system coupled with a scanner for performing an automatic scan operation, which allows the user to operate the scanner without requiring the user to specify image processing settings, so that the user operation can be made very easy.

In accordance with the foregoing and other objectives, the invention proposes a new user interface for scanners. Fundamentally, the invention allows the user to scan an original document without requiring the user to specify image processing settings for the scan operation. The suited image processing settings can be automatically specified based on the image qualities of the primitive scanned image, and which are specified to such values that would make the image qualities of the final scanned image as close to the image qualities of the original document as possible. This feature allows users of any skill level to perform the scan operation without having to specify any image processing settings to the scan operation, making the use of the scanner easier and more user-friendly than the prior art.

The invention is designed for use with a user interface incorporated in a computer system coupled with a scanner for performing an automatic scan operation on an original document. The computer system runs a scanner driver and an application program. The scanner driver is used to drive the scanner, and the application program can process the scanned image as an image file.

The method of the invention includes the following procedural steps: (1) storing a set of default image processing settings in the user interface; (2) activating the scanner to perform a primitive scan operation on the original document based on the default image processing settings to thereby obtain a primitive scanned image which is then transferred to the scanner driver; (3) activating the scanner driver to perform a set of image processing routines on the primitive scanned image to thereby obtain the image qualities of the original document; and based on the image qualities of the original document, specifying a set of suited image processing settings for optimal scan of the original document; and (4) activating the scanner to perform a final scan operation on the original document based on the suited image processing settings to thereby obtain a final scanned image which is transferred to the application program for use by the application program. The application program can be either an image editing program or a word processor that can accept the final scanned image as an image file.

In the foregoing method, the image processing routines include automatic cutting, distortion correction, color calibration, and automatic character recognition. Further, the scanner driver will specify the suited image processing settings to such values that will make the image qualities of the final scanned image as close to the image qualities of the original document as possible. These suited image processing settings are then used in the final scan operation to obtain the final scanned image whose image qualities would be close to the original document. The final scanned image is then transferred to the scanner driver in the computer system, and then transferred via the scanner driver to the application program specified by the user through the user interface. The application program can be either an image editing program or a word processor that can accept the final scanned image as an image file.

By the invention, the user first needs to place the original document on the scanner, and then press a scan button to activate the scan operation. After this, all the user needs to do is simply wait until the final scanned image is produced. The user need not specify any image processing settings. These will be automatically specified by the user interface based on the image qualities of the primitive scanned Image. This feature allows users of any skill levels to perform the scan operation without having to specify any image processing settings to the scan operation, making the use of the scanner easier and more user-friendly than the prior art. Moreover, since the user need not spend time and material on learning the operation of the scanner, it also makes the use of the scanner more economical.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 1:
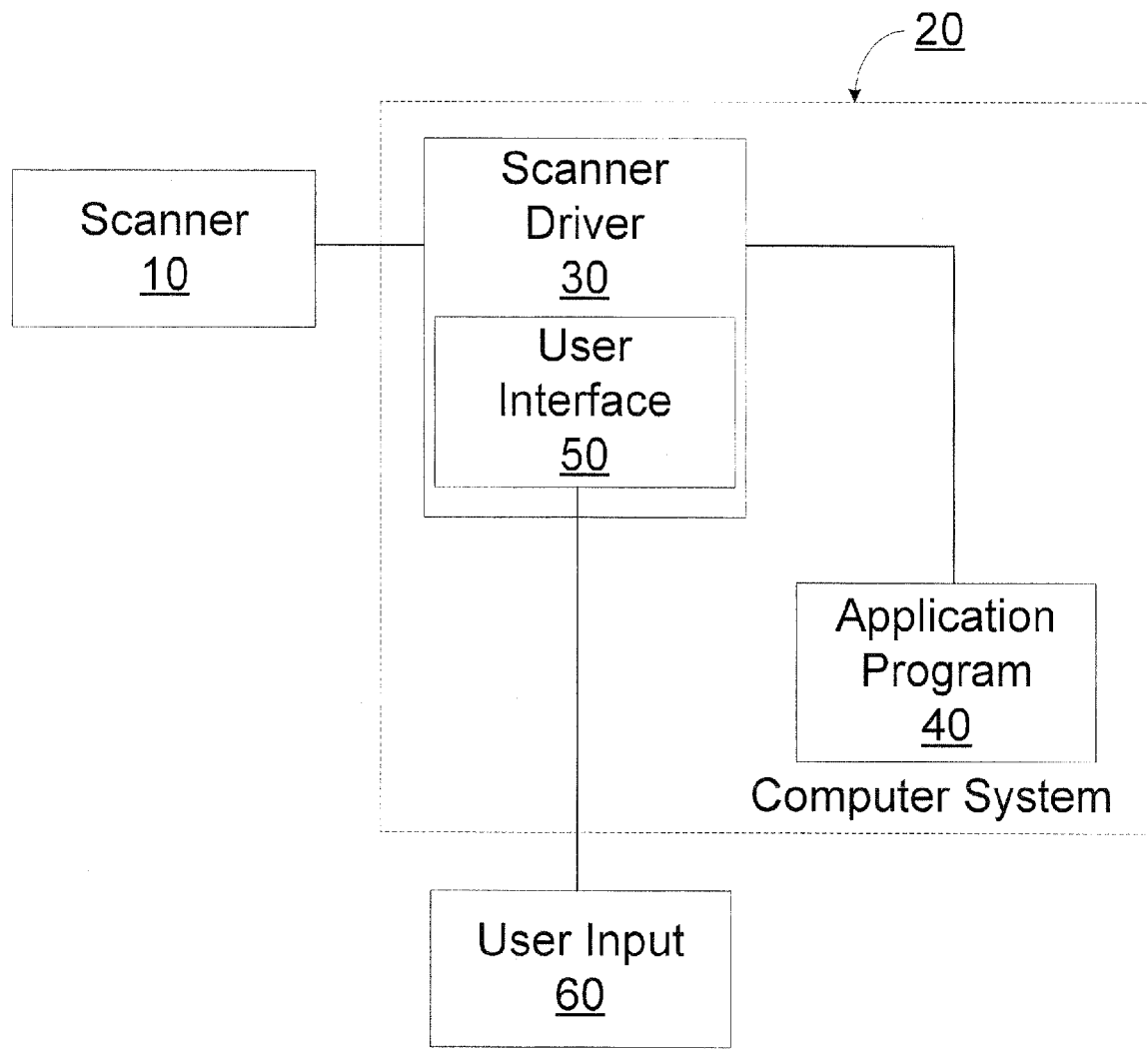
FIG. 1 is a schematic block diagram of the incorporation of the user interface of the invention in a computer system coupled with a scanner.

FIG. 1 is a schematic block diagram of the incorporation of the user interface of the invention, as the block designated by the reference numeral 50, in a computer system 20 coupled with a scanner 10. The computer system 20 runs a scanner driver 30, which is a software program, for driving the scanner 10. Further, the computer system 20 runs an application program 40 which can process the scanned image from the scanner 10 as an image file. The user interface 50 contains a set of default image processing settings, including, for example, color setting, DPI setting, and image size setting. The block designated by the reference numeral 60 is used to represent the input from user operation.

When the user wants to obtain a scanned image from an original document (not shown), the user first needs to place the original document (not shown) on the scanner 10. Next, the user simply needs to press a scan button (not shown) to cause the user interface 50 to activate the scanner 10 to perform a primitive scan operation on the original document (not shown) based on the default image processing settings in the user interface 50 to thereby obtain a primitive scanned image. The primitive scanned image is then transferred to the scanner driver 30 in the computer system 20.

Next, the scanner driver 30 performs an image-enhancement process on the primitive scanned image. The image-enhancement process includes several image processing routines, including automatic cutting, distortion correction, color calibration, and automatic character recognition.

Based the results from the foregoing image processing routines, the scanner driver 30 can recognize the image qualities of the original document and thereby automatically specify a set of suited image processing settings for optimal scan of the original document. These suited image processing settings also include color rendition, DPI, and image size, which will then override the default settings in the user interface 50, and also include the optimal settings for automatic cutting, distortion correction, color calibration, and automatic character recognition.

The scanner driver 30 will then use these suited image processing settings to perform a final scan operation on the same original document to thereby obtain a final scanned image. The final scanned image is then transferred to the scanner driver 30 in the computer system 20, and then transferred via the scanner driver 30 to the application program 40 specified by the user through the user interface 50. The application program 40 can be either an image editing program or a word processor that can process the final scanned image as an image file.

Figure 2:
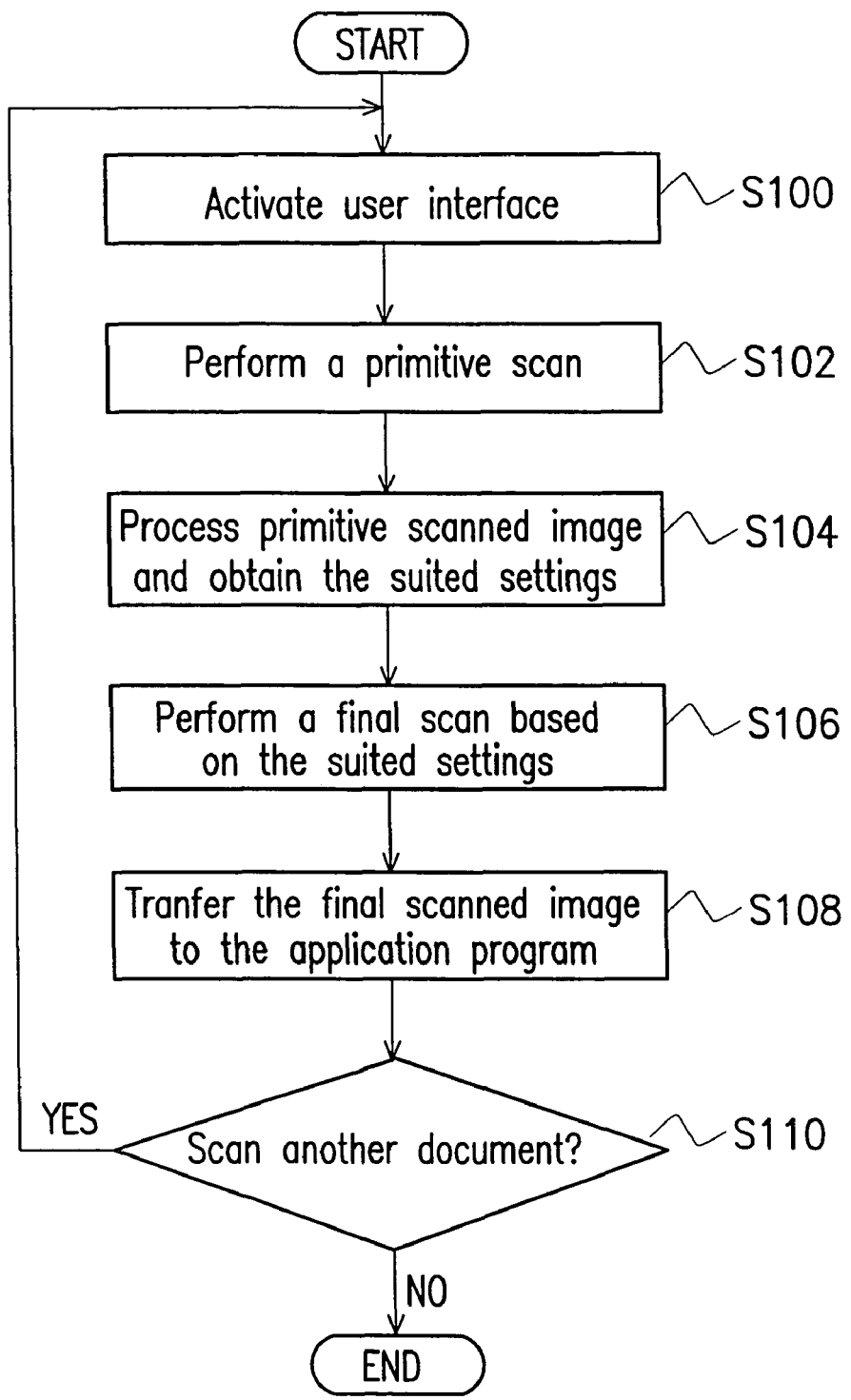
FIG. 2 is a flow diagram showing the procedural steps involved in the method of the invention for performing an automatic scan operation on an original document.

FIG. 2 is a flow diagram showing the procedural steps involved in the method of the invention for performing an automatic scan operation on the original document. This method is used with the computer system 20 and the scanner 10 shown in FIG. 1 and is performed by the user interface 50.

In the first step S100, the user interface 50 is activated. This user interface 50 is preset with a set of default image processing settings, including, for example, color setting, DPI setting, and image size setting.

In the next step S102, the user interface 50 commands the scanner 10 to perform a primitive scan operation on the original document based on the default image processing settings in the user interface 50 to thereby obtain a primitive scanned image. The primitive scanned image is then transferred to the scanner driver 30.

In the next step S104, the scanner driver 30 is activated to perform an image-enhancement process on the primitive scanned image. The image-enhancement process includes automatic cutting, distortion correction, color calibration, and automatic character recognition.

Based the results from the foregoing image processing routines, the scanner driver 30 can recognize the image qualities of the original document and thereby automatically specify a set of suited image processing settings for optimal scan of the original document. These suited image processing settings also include color rendition, DPI, and image size, which will then override the default settings in the user interface 50, and also include the optimal settings for automatic cutting, distortion correction, color calibration, and automatic character recognition.

For example, if the default image processing settings are such that the color setting is COLOR and the DPI setting is 600 dpi; while the original document is a low-resolution B/W (black and white) document. In this case, the original document can be scanned with B/W setting and a low resolution setting. Through the image processing routines on the primitive scanned image, the image qualities of the original document can be recognized, allowing the scanner driver 30 to change the image processing settings from the default settings (COLOR, 600 dip) to the suited settings (B/W, 300 dpi). Fundamentally, the scanner driver 30 will specify the suited image processing settings as close to the image qualities of the original document as possible.

In the next step S106, the user interface 50 activates the scanner 10 to perform a final scan operation on the original document based on the suited image processing settings to thereby obtain a final scanned image.

In the next step S108, the final scanned image is transferred via the scanner driver 30 to the application program 40 so that the final scanned image can be used by the application program 40. The application program 40 can be either an image editing program or a word processor that can process the final scanned image as an image file.

In the next step S110, the user interface 50 displays a message asking whether the user wants to scan another document. If the user responds with YES, the procedure returns to the step S100; otherwise, the procedure is ended.

In conclusion, the invention provides a method and user interface for performing an automatic scan operation for a scanner coupled to a computer system, which allows the user to scan an original document without requiring the user to specify image processing settings to the scan operation. The suited image processing settings can be automatically obtained based on the image qualities of the primitive scanned image. This feature allows users of any skill levels to perform the scan operation without having to specify any image processing settings to the scan operation, making the use of the scanner easier and more user-friendly than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A method implemented on a computing system, the method comprising:
    performing a primitive first scan operation on a document based on a set of default image processing settings to obtain a primitive scanned image;
    performing a set of image processing routines on the primitive scanned image to obtain image qualities of the document, the image processing routines including determining whether the primitive scanned image represents text;
    specifying a set of image processing settings for the document based at least in part on the obtained image qualities; and
    performing a second scan operation on the document based at least in part on the specified image processing settings.

2. The method of claim 1, wherein the specified image processing settings are specified in accordance with the obtained image qualities of the document.

3. The method of claim 1, wherein the computer system is further adapted to execute an application program.

4. The method of claim 3, wherein the application program comprises an image editing program.

5. The method of claim 3, wherein the application program comprises a word processor program.

6. The method of claim 3, and further comprising transferring an image obtained from the second scan to said application program.

7. A user interface implemented on a computer system, the user interface comprising:
    means for performing a primitive first scan operation on a document based on a set of default image processing settings to obtain a primitive scanned image;
    means for performing a set of image processing routines on the primitive scanned image to obtain image qualities of the document, the image processing routines including determining whether the primitive scanned image represents text characters;
    means for obtaining a set of image processing settings for the document based at least in part on the obtained image qualities; and
    means for performing a second scan operation on the document based at least in part on the obtained speei4ied image processing settings.

8. A user interface implemented on a computer system, the user interface comprising: a means for performing a primitive scan operation on a document based on a set of default image processing settings to obtain a primitive scanned image; means for performing a set of image processing routines on the primitive scanned image to obtain image qualities of the document, the image processing routines including determining whether the primitive scanned image represents text characters; means for obtaining a set of image processing settings for the document based at least in part on the obtained image qualities; and means for performing a second scan on the document based at least in part on the specified image processing settings.

9. The user interface of claim 8, wherein the specified image processing settings are obtained in accordance with the obtained image qualities of the document.

10. The user interface of claim 7, wherein the application program comprises an image editing program.

11. The user interface of claim 7, wherein the application program comprises a word processor program.

12. The user interface of claim 9, wherein the application program comprises an image editing program.

13. A computer-readable storage medium having stored thereon instructions which, when executed, perform a method, comprising: performing a primitive scan on a document based on a set of default image processing settings to obtain a primitive scanned image to provide to the scanner driver; performing a set of image processing routines on the primitive scanned image to obtain image qualities of the document, the image processing routines including determining whether the document includes color images; specifying a set of image processing settings for the document based at least in part on the obtained image qualities; and performing a second scan on the document based at least in part on the specified image processing settings.

14. The computer-readable storage medium of claim 13, wherein the instructions, when further executed, further results in the specified image processing settings being specified in accordance with the obtained image qualities of the document.

15. The computer-readable storage medium of claim 13, wherein the application program comprises an image editing program.

16. The computer-readable storage medium of claim 13, wherein the application program comprises a word processor program.

17. An apparatus, comprising:
    A scanner to perform a primitive scan operation on a document based on a set of default image processing settings to obtain a primitive scanned image; circuitry to perform a set of image processing routines on the primitive scanned image to obtain image qualities of the document, the image processing routines including automatic character recognition; circuitry to obtain a set of image processing settings for the document based at least in part on the specified image processing settings.

18. The apparatus of claim 17, wherein the specified image processing settings are obtained in accordance with the obtained image qualities of the document.

* * * * *

UNITED STATES PATENT AND TRADEMARK OFFICE
CERTIFICATE OF CORRECTION

PATENT NO.         : 7,430,066 B2
APPLICATION NO.    : 10/626200
DATED              : September 30, 2008
INVENTOR(S)        : Hsu et al.

It is certified that error appears in the above-identified patent and that said Letters Patent is hereby corrected as shown below:

At column 5, line 40, please replace "scan to said" with --scan operation to said--.
At column 5, line 56, please replace "obtained speei4ied" with --obtained--.
At column 5, line 58, please replace "A user interface implemented on a computer system, the user interface comprising: a means for performing a primitive scan operation on a document based on a set of default image processing settings to obtain a primitive scanned image; means for performing a set of image processing routines on the primitive scanned image to obtain image qualities of the document, the image processing routines including determining whether the primitive scanned image represents text characters; means for obtaining a set of image processing settings for the document based at least in part on the obtained image qualities; and means for performing a second scan on the document based at least in part on the specified image processing settings." with --The user interface of claim 7, wherein the obtained image processing settings are obtained in accordance with the obtained image qualities of the document.--.
At column 6, line 12, please replace "The user interface of claim 8, wherein the specified image processing settings are obtained in accordance with the obtained image qualities of the document." with --The user interface of claim 7, wherein the computer system is further adapted to execute an application program.--.
At column 6, line 15, please replace "claim 7" with --claim 9--.
At column 6, line 17, please replace "claim 7" with --claim 9--.
At column 6, line 19, please replace "The user interface of claim 9, wherein the application program comprises an image editing program." with --The user interface of claim 9, and further comprising transferring an image obtained from the second scan operation to said application program.--.
At column 6, line 21, please replace "A computer-readable storage medium having stored thereon instructions which, when executed, perform a method, comprising: performing a primitive scan on a document based on a set of default image processing settings to obtain a primitive scanned image to provide to the scanner driver; performing a set of image processing routines on the primitive scanned image to obtain image qualities of the document, the image processing routines including determining whether the document includes color images; specifying a set of image processing settings for the document based at least in part on the obtained image qualities; and performing a second scan on the document based at least in part on the specified image processing settings." with --A computer-readable storage medium having stored thereon instructions which, when executed, perform a method, comprising: ¶ performing a primitive first scan on a document based on a set of default image processing settings to obtain a primitive scanned image to provide to the scanner driver; ¶ performing a set of

UNITED STATES PATENT AND TRADEMARK OFFICE
CERTIFICATE OF CORRECTION

PATENT NO. : 7,430,066 B2
APPLICATION NO. : 10/626200
DATED : September 30, 2008
INVENTOR(S) : Hsu et al.

It is certified that error appears in the above-identified patent and that said Letters Patent is hereby corrected as shown below:

image processing routines on the primitive scanned image to obtain image qualities of the document, the image processing routines including determining whether the document includes color images; ¶ specifying a set of image processing settings for the document based at least in part on the obtained image qualities; and ¶ performing a second scan operation on the document based at least in part on the specified image processing settings.--.

At column 6, line 45, please replace "A scanner to perform a primitive scan operation on a document based on a set of default image processing settings to obtain a primitive scanned image; circuitry to perform a set of image processing routines on the primitive scanned image to obtain image qualities of the document, the image processing routines including automatic character recognition; circuitry to obtain a set of image processing settings for the document based at least in part on the specified image processing settings." with --a scanner to perform a primitive scan operation on a document based on a set of default image processing settings to obtain a primitive scanned image; ¶ circuitry to perform a set of image processing routines on the primitive scanned image to obtain image qualities of the document, the image processing routines including automatic character recognition; and ¶ circuitry to obtain a set of image processing settings for the document based at least in part on the obtained image qualities.--.

At column 6, line 55, please replace "the specified image" with --the obtained image--.

Signed and Sealed this

Eleventh Day of August, 2009

David J. Kappos
*Director of the United States Patent and Trademark Office*